United States Patent
Seidl et al.

(10) Patent No.: US 6,726,569 B1
(45) Date of Patent: Apr. 27, 2004

(54) DIVIDED FLYWHEEL

(75) Inventors: Holger Seidl, Bühl (DE); Gerhard Ronner, Hebrontshausen (DE); Martin Kirschner, Müchen (DE)

(73) Assignee: LuK Lamellen und Kupplungsbau Beteiligungs KG, Buhl/Baden (DE)

( * ) Notice: Subject to any disclaimer, the term of this patent is extended or adjusted under 35 U.S.C. 154(b) by 56 days.

(21) Appl. No.: 09/685,050

(22) Filed: Oct. 6, 2000

Related U.S. Application Data

(63) Continuation of application No. PCT/DE99/01039, filed on Mar. 30, 1999.

(30) Foreign Application Priority Data

Apr. 6, 1998 (DE) .......................... 198 15 417

(51) Int. Cl.⁷ .............. F16F 11/00; F16D 3/12
(52) U.S. Cl. ...................... 464/68; 192/208
(58) Field of Search .................. 464/68; 192/208, 192/212

(56) References Cited

U.S. PATENT DOCUMENTS

| | | | | |
|---|---|---|---|---|
| 4,346,773 A | * | 8/1982 | Hofbauer et al. ........ 180/165 |
| 5,138,902 A | * | 8/1992 | Miller et al. ............ 464/180 |
| 5,755,302 A | * | 5/1998 | Lutz et al. ............. 180/65.2 |
| 5,773,904 A | * | 6/1998 | Schiebold et al. .......... 310/92 |
| 5,873,445 A | * | 2/1999 | Haberbusch et al. ....... 192/208 |
| 5,911,628 A | * | 6/1999 | Sundau et al. ............. 464/24 |
| 5,927,452 A | * | 7/1999 | Freise et al. ........... 192/3.52 |
| 6,152,249 A | * | 11/2000 | Li et al. ............... 180/205 |
| 6,209,692 B1 | * | 4/2001 | Pels et al. ............... 464/82 |
| 6,253,437 B1 | * | 7/2001 | Levin .................... 29/271 |
| 6,294,854 B1 | * | 8/2001 | Grosspietsch et al. ...... 310/92 |
| 6,299,541 B1 | * | 10/2001 | Bertin et al. ............. 464/68 |
| 6,302,253 B1 | * | 10/2001 | Link et al. ............ 192/55.61 |
| 6,373,205 B1 | * | 4/2002 | Weimer et al. ........... 318/114 |
| 6,437,467 B1 | * | 8/2002 | Schierling et al. ......... 310/51 |
| 6,474,428 B1 | * | 11/2002 | Fujikawa et al. ......... 180/65.2 |

FOREIGN PATENT DOCUMENTS

| | | |
|---|---|---|
| DE | 30 13 424 A1 | 10/1981 |
| DE | 36 10 127 A1 | 12/1986 |

\* cited by examiner

*Primary Examiner*—Lynne H. Browne
*Assistant Examiner*—Kenneth Thompson
(74) *Attorney, Agent, or Firm*—Darby & Darby

(57) ABSTRACT

A divided flywheel having two flywheel masses which can be rotated in relation to each other, counter the action of a damping device, preferable in order to dampen the torsional vibrations of an internal combustion engine.

77 Claims, 5 Drawing Sheets

DIVIDED FLYWHEEL

This is a continuation of International Application Serial No. PCT/DE 99 01039, filed Mar. 30, 1999, the entire disclosure of which is incorporated herein by reference.

BACKGROUND AND SUMMARY OF THE INVENTIONS

The invention relates to a divided flywheel consisting of a primary flywheel mass connected secured against rotation with the drive shaft of an internal combustion engine, and a secondary flywheel mass wherein the two flywheel masses are mounted one on the other and able to rotate opposite one another relatively against the action of a damping device and the primary flywheel mass supports on its radially outer circumference a rotor of an electric machine.

A damping device with an integrated electric machine whose rotor is attached to the external circumference of the flywheel is known from DE OS 30 13 424. Devices of this kind are mainly used for starting up the internal combustion engine and for producing power in an electric machine as well as hybrid drives.

With one design mentioned at the beginning a torsional vibration damper is provided between the flywheel and gear input shaft and only dampens torsional vibrations coming from the internal combustion engine when the clutch is engaged.

Furthermore these devices have their own torsional vibration forms which lie in the region of the used speed band of the internal combustion engines and thus create loss of comfort in the drive train.

Divided flywheels which do not have these faults are adequately known—such as for example from DE 36 10 127 C2—without a rotor.

Divided flywheels of this kind are mainly filled with grease or oil and have the drawback that increased amounts of heat supplied through blind performances of the electric machine through the rotor, and thus raised operating temperatures, cause a severely fluctuating damping behaviour and/or dilution or liquefying of the oil or grease.

The object of the present invention is therefore to provide a damping device for a device having an electric machine rotating coaxially about the axis of rotation of the internal combustion engine, which has a high damping comfort over the entire speed range with simultaneous stability in respect of the temperature fluctuations which are introduced through the electric machine, and which can be housed in an installation space provided axially and radially by the electric machine. Furthermore this device is to be produced cost-effectively by using easily manufactured individual parts and is to be simple to assemble.

The flywheel according to the invention having the rotor attached to the primary flywheel disc is in active electric connection by its rotor with the stator of the electric machine which is connected directly or indirectly to the motor housing and/or to the gearbox housing.

The flywheel according to the invention having a rotor attached to the primary flywheel disc is in electric connection by its rotor with the stator of the electric machine which is connected directly or indirectly to the motor housing and/or to the gearbox housing.

According to the present invention this is achieved in that a divided flywheel is proposed consisting of a primary flywheel mass connected secured against rotation to the drive shaft of an internal combustion engine and of a secondary flywheel mass, wherein the flywheel masses are mounted one on the other and able to rotate relative to each other against the action of a damping device, and that the primary flywheel mass consists at least of a flywheel disc connected to the drive shaft and having on its outer circumference an axially aligned ring-shaped platform on which the rotor of an electric machine is fixed, with the secondary flywheel mass having a flywheel disc which supports a clutch for coupling and uncoupling a following unit in the force flow.

Through this bell-shaped impression of the primary flywheel disc which can be produced by cold reshaping technology an assembly is formed which supports the rotor substantially freely by holding the rotor on its axially extending external circumference without forming thermal bridges for a heat flow from the rotor to the damping device. The result of this is that the divided flywheel has a thermal barrier between the rotor and damping device, i.e. the damping device is thermally uncoupled from the rotor.

It is thereby expedient if the thermal uncoupling takes place through an air gap formed between the radially outer circumference of the damping device and the axially extending platform holding the rotor on the outer circumference of the primary flywheel disc. Also the system of air gaps between the primary and/or secondary flywheel disc on one side and the damping device on the other can produce a cooling action, particularly when the air gaps are automatically ventilated through the rotation of the flywheel during operation.

For this purpose in order to ventilate these air gaps and thus the damping device a sufficient number of air slits can be provided in one or both flywheel discs where they are spread out round a circumference whose diameter is preferably the diameter of the circumference of the chamber formed by the side parts of a flywheel disc and holding the energy accumulator of the damping device, and thus the grease or oil introduced for lubrication and when using hydraulic systems—for example according to DE 36 10 127 C2—for damping is cooled and thus produces ideal constant damping conditions.

In further embodiments insulating materials of any kind, such as for example ceramic and/or plastics can be provided between the rotor and damping device to produce a thermal insulation between the damping device and rotor.

Likewise the fastening device for the rotor on the secondary flywheel disc and/or the rotor can have on the circumferential side a groove-shaped profile, for example axially running grooves which reduces the effective bearing surface of the rotor and thus creates a thermal insulating effect.

This profile can be imprinted so that the rotation of the flywheel produces an automatic ventilation for example through air guide plates or through a suitably shaped fastening device.

According to the invention the rotor or a device enclosing same for fixing purposes can be connected with keyed engagement by an internal profiled section to the ring surface having an external profiled section wherein the internal profile has internal gearing with at least one tooth and the external profile has external gearing with at least one tooth gap, more advantageously however gearing with evenly spaced teeth and tooth gaps is. the preferred means.

A further variation is the use of at least one groove and one spring complementary therewith as the external and internal profile producing the positive locking engagement.

In order to secure the axial strength in addition axial welding is provided between the ring face and rotor which in a corresponding design can also alone form the connection.

To this end a flat surface welding is carried out radially on the external and internal circumferences of the ring face and rotor, for example by means of the impulse welding process. Furthermore the rotor can be pressed and/or staked onto the ring face. Riveting is likewise recommended, for example between a further flange-like radially outwardly extending shaped area which adjoins the axial path of the platform and can serve at the same time as an axial stop for the rotor whereby rivets in the axial direction over a preset circumference can produce the connection with the rotor.

A further inventive idea proposes dividing the primary flywheel disc into two parts, namely into a radially outer support part relative to the circle of holes for fixing the flywheel on the drive shaft, and which holds the rotor, and into a radially inner bearing pin forming the bearing for the secondary flywheel disc.

The advantage here is the easier production of two less complex disc parts Both parts are housed and centred on centring noses which can be attached to the drive shaft or a component part connected therewith wherein a sequential build-up of several discs can be formed in the axial direction in addition a disc can be added forming the input part of the damping device and which can likewise be attached on the drive shaft with the same fastening means—wherein each disc is centred on the disc below.

The mutual bearing of the two flywheel disc parts on each other is undertaken by means of sliding or rolling bearings wherein the primary flywheel disc can be mounted on the secondary flywheel disc and the secondary flywheel disc can be mounted on the primary flywheel disc.

Likewise the bearing can be provided radially outside and radially inside the fastening device on the drive shaft wherein for reasons of costs the radially inner attachment is preferred and for reasons of stability the radially outer bearing can be preferred. When using a sliding bearing the use of an axial stop is advisable. According to the invention a ring-shaped stop with a rectangular profile is used.

In order to stabilise the shafts of the gearbox and internal combustion engine which are ideally aligned with no stagger relative to each other a pilot bearing can be provided which is fitted into a centring bore of a flywheel disc preferably in the primary disc or correspondingly in its bearing pin and holds the gearbox shaft. In order to rule out excess wear and avoid a hardening process for the flywheel disc or bearing pin it is possible to provide a bearing bush between the flywheel disc (bearing pin) and the pilot bearing.

In accordance with the invention the two flywheel discs are rotatable relative to each other wherein they can be turned against the action of the damping device. For this each flywheel disc has at least one biasing device for the energy accumulators, at least two coil compression springs which are spread out round a preset circumference and which are boxed in each other and pre-curved approximately to their insert diameter and/or can be short relative to the insert circumference and are provided in a suitable number.

The chamber containing the energy accumulator is formed by one of the two flywheel discs wherein axial indentations define the coil compression springs in their extension on the circumferential side and thus form the biasing device of the corresponding flywheel disc.

On its outer circumference anti-wear shells can be attached in the chamber between the inside wall of the chamber and the coil compression springs to minimize the friction of the springs and the inside wall of the chamber by adapting to the hardness of the contact faces. The use of grease as a lubricant is possible as an alternative or in addition.

The chamber can be formed in one piece out from the flywheel disc or from two connected parts of the flywheel disc. In order to optimise the thermal uncoupling it is also possible to shape a side part which is connected only to the fastening devices on the drive shaft with the primary flywheel disc in order to form the chamber so that this forms the input part of the damping device. The output part is in this case formed as a flange connected radially inside the damping device to the secondary flywheel disc and having radially on the outside extension arms which serve as biasing devices for the energy accumulator.

AS a further development according to the invention the input part of the primary flywheel disc can be a radially inwardly directed flange in the region of the axially aligned ring face holding the rotor wherein the flange is welded and/or staked to the platform.

The flange can form a positive locking connection by means of an external profile with the ring surface which has an internal profile.

On its inner circumference this radially inwardly directed flange contains extension arms corresponding in number to the energy accumulators which serve as biasing devices for the energy accumulators.

The output part of the secondary flywheel disc is formed in this embodiment by two side parts which contain chambers which are open on one side on the outer circumference and which contain the energy accumulators, wherein the number of chambers corresponds to the number of energy accumulators and the radially inwardly directed flange engages as the input part of the primary flywheel disc in the open side of the chambers.

One or both side parts forming the chambers can thereby be fixed on the secondary flywheel disc and/or on the contact pressure plate of the clutch wherein the secondary flywheel disc in this case consists of a bearing pin centring the clutch and of the clutch with the pressure plate which holds the side parts of the damping device.

To this end the fastening means of the side parts of the damping device advantageously engage through a number of oblong holes which corresponds to the number of fastening means whereby the oblong holes extend approximately evenly over a circumference over the angle of the relative maximum rotation between the primary and secondary flywheel discs so that a relative rotation of the two flywheel discs relative to each other remains and in order to maintain the play between the flange and side parts distance rings space out the side parts and the flange is supported axially against a plate spring and thus the play of the flange becomes fixed.

When using chambers filled with grease or oil it is advantageous to seal the chamber in order to prevent losses and leakage. For this the flange and side parts are sealed from each other by sealing means.

A seal of the chamber by sealing means between a side part and the flange on one side and between the flange and the radially inwardly extended bearing pin on the other side is also possible.

The sealing means are advantageously fixed by injection moulded parts which fit by means of axially imprinted noses in recesses provided in the flange, bearing pin and/or side part, and by means of at least one spring element on which they are supported against the flange, bearing pin and/or side part.

In order to configure the spatial arrangement according to the invention the shape of the secondary flywheel disc can be selected so that it extends frusto-conically in the axial direction with the tip of the truncated cone facing the primary flywheel disc.

In order to minimize the axial structural width and a neutral rotation behaviour the bearing of the flywheel discs on each other is preferably undertaken roughly at the same axial height as the central axial extension of the rotor and/or roughly at the same axial height as the central axial extension of the damping device. An arrangement of the rotor in a general manner on component parts belonging to the primary flywheel mass for optimising the axial structural space and cost-effective production can likewise be advantageous.

It is also advantageous to arrange the damping device at roughly the same axial height radially inside the rotor. The arrangement of the clutch is preferably radially inside the greatest axial extension of the stator belonging to the electric machine. Furthermore the damping device can be attached radially inside a clutch formed from at least two contact pressure plates with friction linings arranged inbetween, so that the axial structural space can be further reduced.

For a simplified fitting of the flywheel on the drive shaft recesses can be provided in the secondary flywheel disc for the assembly tools which can likewise be suitable for ventilating the radially inner region of the flywheel and the damping device.

The flywheel can be for example part of a drive train wherein the clutch directly follows the input shaft of the gearbox in the force flow or another unit connected in, such as for example a further clutch or additional flywheel.

To ensure the smoothest possible running the flywheel is balanced either with or without the fitted rotor, whereby the compensating weights are attached to the flywheel disc preferably on the support disc and/or on the side part forming the chamber for the damping device.

BRIEF DESCRIPTION OF THE DRAWINGS

The invention will now be explained in further detail with reference to FIGS. 1 to 5 in which.

DETAILED DESCRIPTION OF THE DRAWINGS

Figure 1:
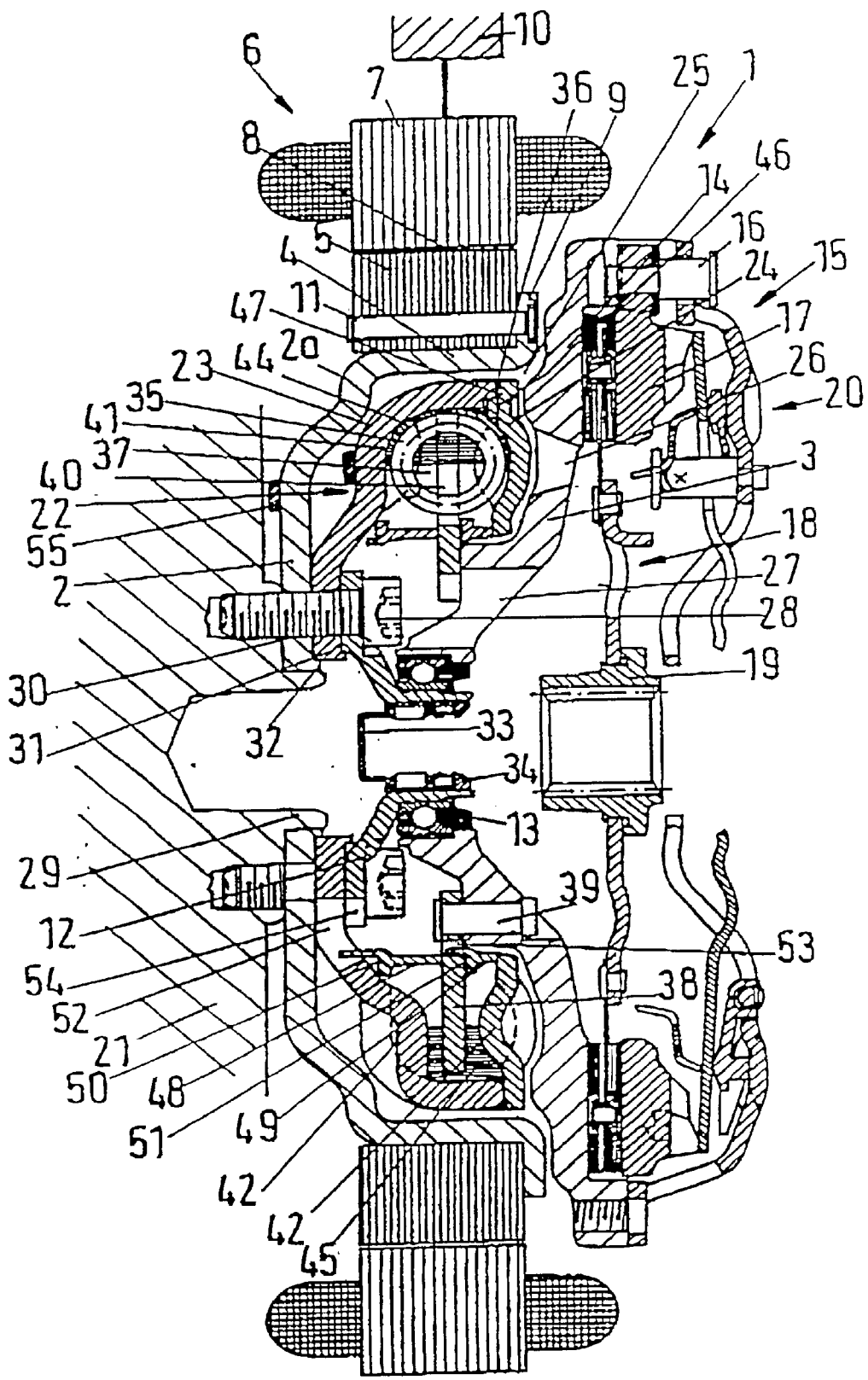
FIG. 1 is a longitudinal sectional view through a flywheel according to the invention.

FIG. 1 shows a divided flywheel 1 having a primary flywheel disc 2 and a secondary flywheel disc 3. An axially aligned ring-shaped platform 4 is formed on the radially outer circumference of the primary flywheel disc 2 and a rotor 5 of an electric machine 6 is attached to the platform 4. The rotor 5 is in electric connection with the stator 7 of the electric machine 6 through the air gap 8. The stator is fixed on the housing 10 of an internal combustion engine or gearbox.

The rotor 5 is in this embodiment riveted by circumferentially evenly spaced out rivets 11 to the flywheel mass 2 on a radially outwardly aligned flange 9 moulded onto the axially aligned ring-shaped platform 4, with the flange serving at the same time as an axial stop for the rotor 5 which through its mass and its radially exposed position forms a significant part for the primary flywheel mass.

In this embodiment the primary flywheel disc 2 is divided into a support part 2a and a bearing pin 12 on which the secondary flywheel disc 3 is mounted rotatable relative to the primary flywheel mass 2 by means of a rolling bearing 13.

The secondary flywheel disc 3 supports on its radially outer circumference the shiftable clutch 15 which comprises the contact pressure plate 14 whose axial profile matches the path of the external circumference 9 of the flywheel disc and the side part 24 of the damping device 22 which faces the secondary flywheel disc 3 so that an air gap 25 is formed which will be described in detail further on. The contact pressure plate 14 is connected by fastening bolts 16 axially displaceable to the pressure plate 17 and a clutch disc 18 which is housed between the contact pressure plate 14 and the pressure plate 17 and which by means of an internally cogged hub 19 in the engaged mode transfers the force flow to a gear input shaft (not shown). The engagement and disengagement processes of the clutch 15 are carried out by the release device 20 in known way.

The secondary flywheel disc 3 has an approximately frusto-conical shaped design which makes it possible to displace the clutch disc 18 axially in the evolving hollow space so that the axial space required is optimized and the bearing of the two flywheel discs 2, 3 is approximately at the same level as the central axial extension of the rotor 5.

The secondary flywheel disc 3 has air slits 26 arranged evenly over the circumference with a diameter roughly equal to that of the damping device, wherein the air slits act to ventilate the air gap 25 which also undertakes the function of thermally uncoupling the entire damping device with the exception of the radially inner side and thereby enables the damping device 22 to be cooled with the ventilation action becoming intensified as the flywheel rotates which thus ensures automatic ventilation of the damping device 22.

In order to cool and ventilate the radially inner side of the damping device 22 recesses 27 are provided in the secondary flywheel disc with these recesses corresponding in diameter and position to the circle of holes in the primary flywheel disc 2 for fixing the flywheel 1 on the drive shaft 21. During assembly the recesses serve as openings for the assembly tools for fixing the flywheel 1 on the drive shaft 1.

For fastening purposes, screws 28 are preferably used with which the support part 2a and the bearing pin 12 as constituent parts of the primary flywheel disc 2 as well as the side part 23 inbetween are screwed onto the drive shaft via snug-fitting bores 30.

The flywheel 1 is centred on an axially protruding shoulder 29 of the motor drive shaft 21, the side part 23 is centred by means of an axially protruding shoulder 31 of the support part 2a, the bearing pin is centred on an axially protruding shoulder 32 of the side part 23.

On its radially inner circumference the bearing pin 12 holds a bearing bush 33 into which a pilot bearing 34 is fitted for the gear input shaft so that any distortion of the common rotational axis of the gearbox and internal combustion engine and any change in the air gap between the rotor and stator of the electric machine is minimized. By using the bearing bush 33 it is no longer necessary to undertake any expensive hardening of the bearing pin 12.

The primary disc 2 and the secondary disc 3 are rotatable coaxially relative to each other by means of the bearing 13. The relative rotation of the two flywheel discs 2, 3 takes place against the action of the damping device 22 which is provided for damping the torsional vibrations.

The first side part 23 belonging to the primary mass is sealingly connected to a second side part 24 by means of a radially outwardly aligned connection, preferably welding 36, and forms the input part of the damping device 22 wherein the two side parts 23, 24 form a ring-shaped chamber 37 which has radially on the inside an opening in which the flange 38 which is connected to the secondary flywheel disc 3 preferably by means of rivets 39 fitted radially inwards in the axial direction and then extending radially outwards, engages by its external circumference to thus form the output part of the damping device 23.

The flange has on its outer circumference radial extension arms 40 which form the biasing devices on the output side for the energy accumulator in the form of coil compression springs 35 of the damping device.

In the illustrated embodiment the two side parts 23, 24 are shaped so that they form radially on the outside a ring-channel like holder 41 in which the springs 35 are contained. The side part 24 is centred by means of an axially protruding nose 46 on an axially protruding shoulder 47 on the side part 23 and is stabilised in the event of high centrifugal forces.

In order to form the biasing devices on the input side axial indentations 42 are provided on the side parts 23, 24 in the form of circumferential stops adapted to the spring length and provided for the coil compression springs 35 which are fitted into the side parts 23, 24 so that the coil compression springs 35 are fitted in the elastically tensioned state into the chambers 40 which are formed dish-shaped at least in part. The coil compression springs are connected with friction and force engagement to the side parts 23, 24.

To protect against wear, a wear-protecting shell 44 is fitted on the outer circumference of the chambers in the area of increased centrifugal force action, and the chambers 37 are filled at least in part with grease and/or oil 45.

The chamber 37 between the flange 38 and the side parts 23, 24 is sealed by means of the sealing rings 48, 49 wherein these sealing rings are supported on the spring rings 50, 51 between the side parts and the flange. The sealing rings 48, 49 are fixed in keyed engagement by means of circumferentially spaced out axially extending noses in recesses 52, 53 provided for same in the flange 38 and in the side part 23, wherein the recesses 52 of the side part 23 also provide the function of a passage for passing through the assembly tool for securing the rivets 39, for which the bearing pin 12 also has recesses 54.

In order to compensate for any imbalance the flywheel 1 is balanced prior to screwing onto the drive shaft by means of the balancing weights 55 wherein the balancing weights 55 can be attached to both the side part 23 and/or to the support part 2a.

Figure 2:
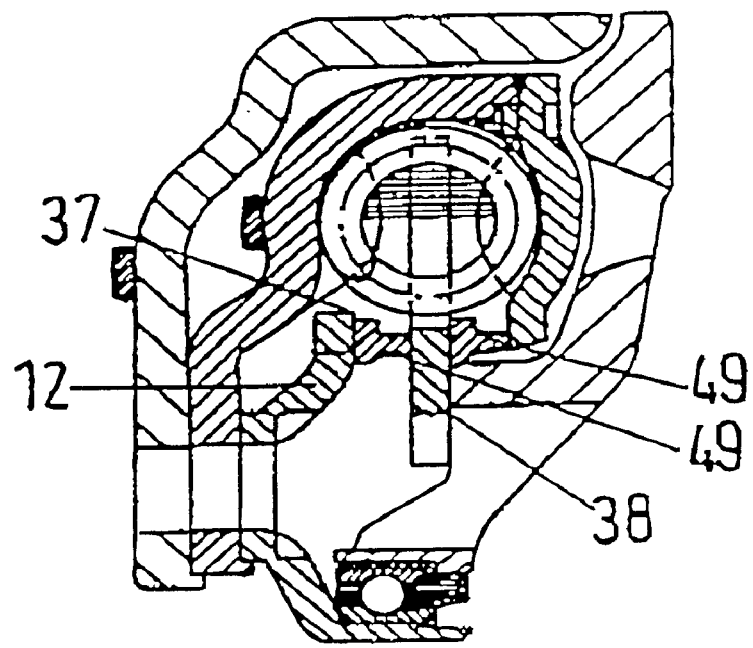
FIG. 2 shows a section of an embodiment with a modified chamber seal.
Figure 2:
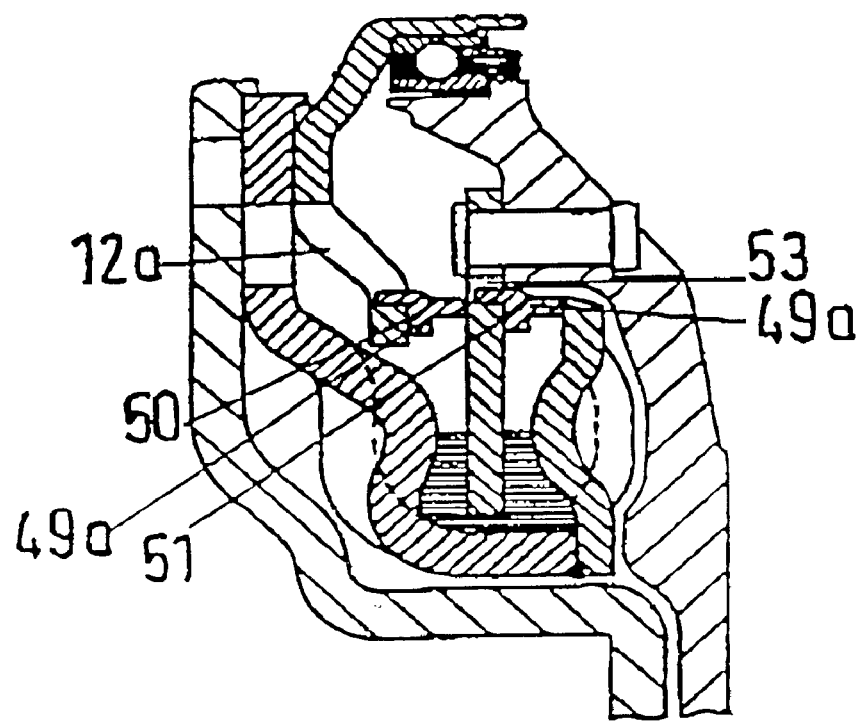

FIG. 2 shows an alternative embodiment of the seal of the chamber 37 of the embodiment of a flywheel 1.

Instead of the seal 48 (FIG. 1) the seal 49 is used twice, namely for sealing between the flange 38 and the side part 24 as well as for sealing between the flange 38 and the bearing pin 12 which for this purpose is frusto-conical in shape and extended radially outwards by a frusto-conical base pointing in the direction of the flange 38.

The axially aligned noses 49a of the sealing rings 49 are engaged in the recesses 12a, 53 of the bearing pin 12 or flange 38 whereby they are supported axially against the spring rings 50, 51.

Figure 3:
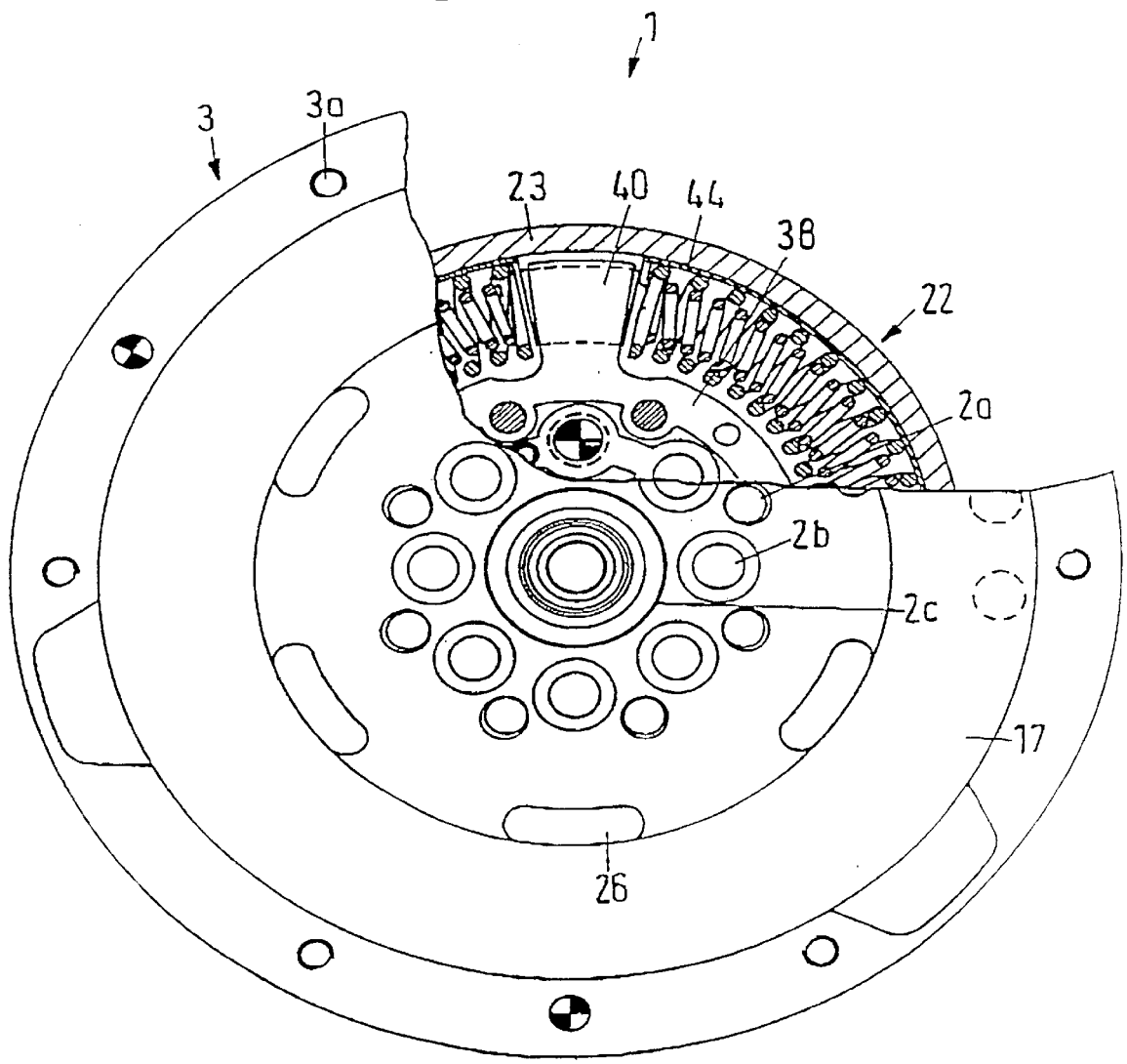
FIG. 3 is a view of the secondary flywheel disc with the damping device in free section.

FIG. 3 shows the flywheel 1 in a plan view from which for reasons of clarity the primary disc 2 with the rotor 5 as well as the clutch 15 with the release unit 20 (FIG. 1) have been omitted.

The secondary flywheel disc 3 with bores provided radially on the outside over the entire circumference for fixing the clutch cover has radially adjoining on the inside the contact pressure plate 17 which in turn is adjoined radially on the inside by the air slits 26 which are spread evenly over the entire circumference for cooling the damping device 22.

A circle of holes with bores 2a for riveting the flange 38 to the secondary flywheel disc 3 is provided in a further radially inwardly aligned path. A circle of holes with larger bores 2b arranged radially inside is used for passing through assembly tools for fixing the flywheel on the drive shaft 21 (FIG. 1) and for further ventilation of the damping device 22. The central bore 2c holds on the inner circumference the rolling bearing for bearing on the primary flywheel disc 2 and in the case of a two part flywheel disc for bearing on the bearing pin 12 (FIG. 1).

Figure 4:
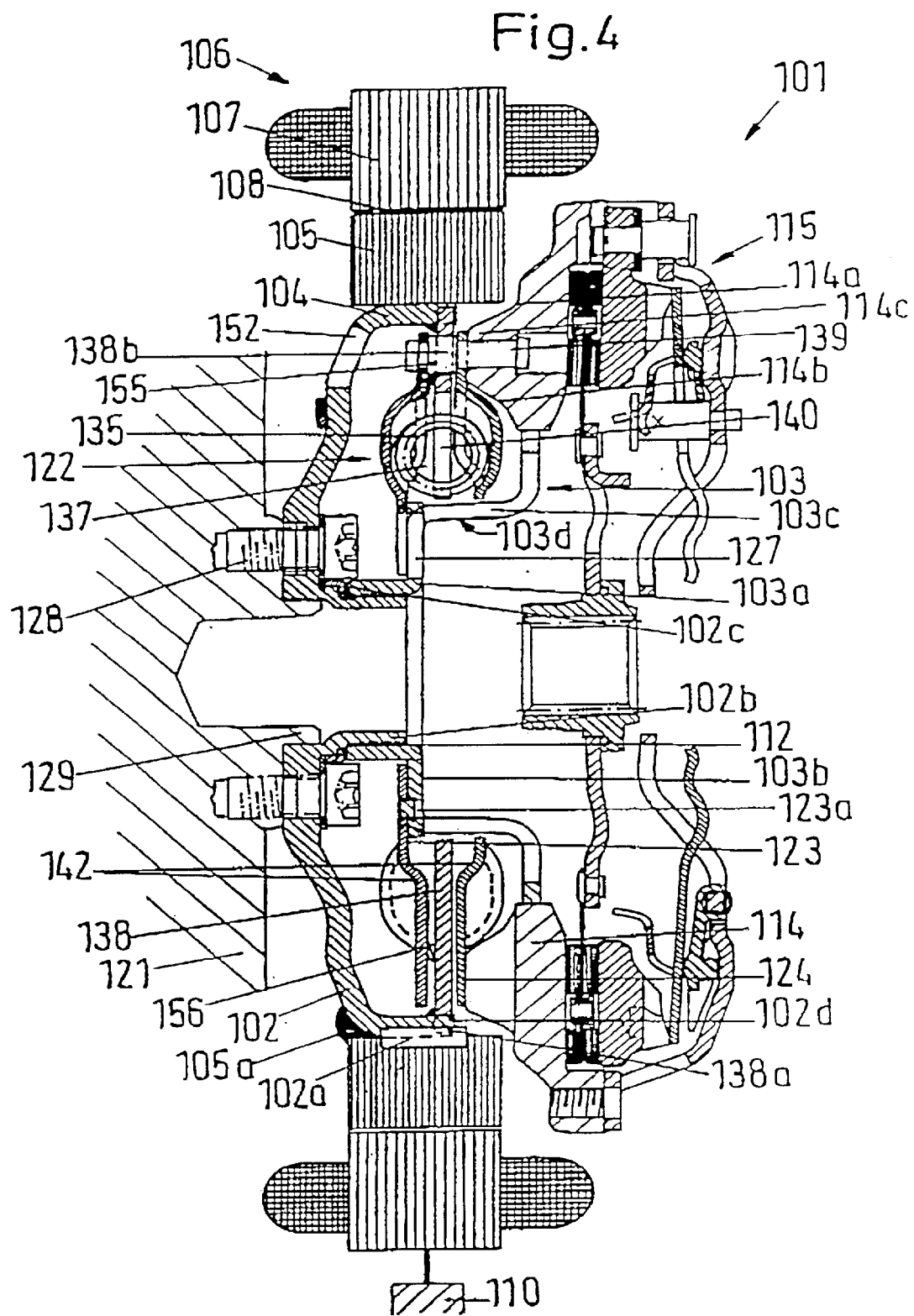
FIG. 4 shows a longitudinal section through a further embodiment of a flywheel according to the invention and FIG. 5 is a view of a secondary flywheel disc shaped as a bearing pin.

The free section provides a view onto the damping device 22 with the side part 23 which forms the chamber 37 on the radially outer circumference. The coil compression springs 35 which here are designed as interboxed curved springs pre-curved to the insert diameter are housed in the chamber 37. The flange 38 has on the outer circumference radially extending extension arms 40 which form the biasing devices for the output part of the damping device 22. In order to reduce the friction through the centrifugal forces at increased motor speeds a wear-protective shell is provided on the radial outer circumference of the coil compression springs 35. Additional filling with lubricant is not shown FIG. 4 shows a further embodiment of a divided flywheel 101 which has a one-piece primary flywheel disc 102 which is fixed by screws 128 on the motor drive shaft 121 and is centred on same by means of an axially protruding shoulder 129.

In the further radially outwardly pointing path the primary flywheel disc is shaped out axially on its outer circumference so that a ring-shaped platform 104 is formed on which is mounted the rotor 105 of the electric machine 106 which contributes to a significant amount to the primary flywheel mass and which is in electric connection with the stator 107 through an air gap 108.

The electric machine is fixedly connected by fastening means (not shown) to the housing 110 of the internal combustion engine or to the gearbox.

The rotor 105 is connected for keyed engagement on the axially extending ring-shaped platform 104 on the outer circumference of the primary flywheel disc 102 by means of a tongued and grooved connection 102a and is protected from axial stagger by means of a welding spot 105a or welding seam provided between the primary flywheel disc 102 and the rotor 105. In the case where the rotor is made from materials which are difficult to weld it is also possible to use staking or a press-fit as well as a radially acting positive locking connection by external and internal teeth on the primary flywheel disc 102 and rotor 105.

Figure 5:
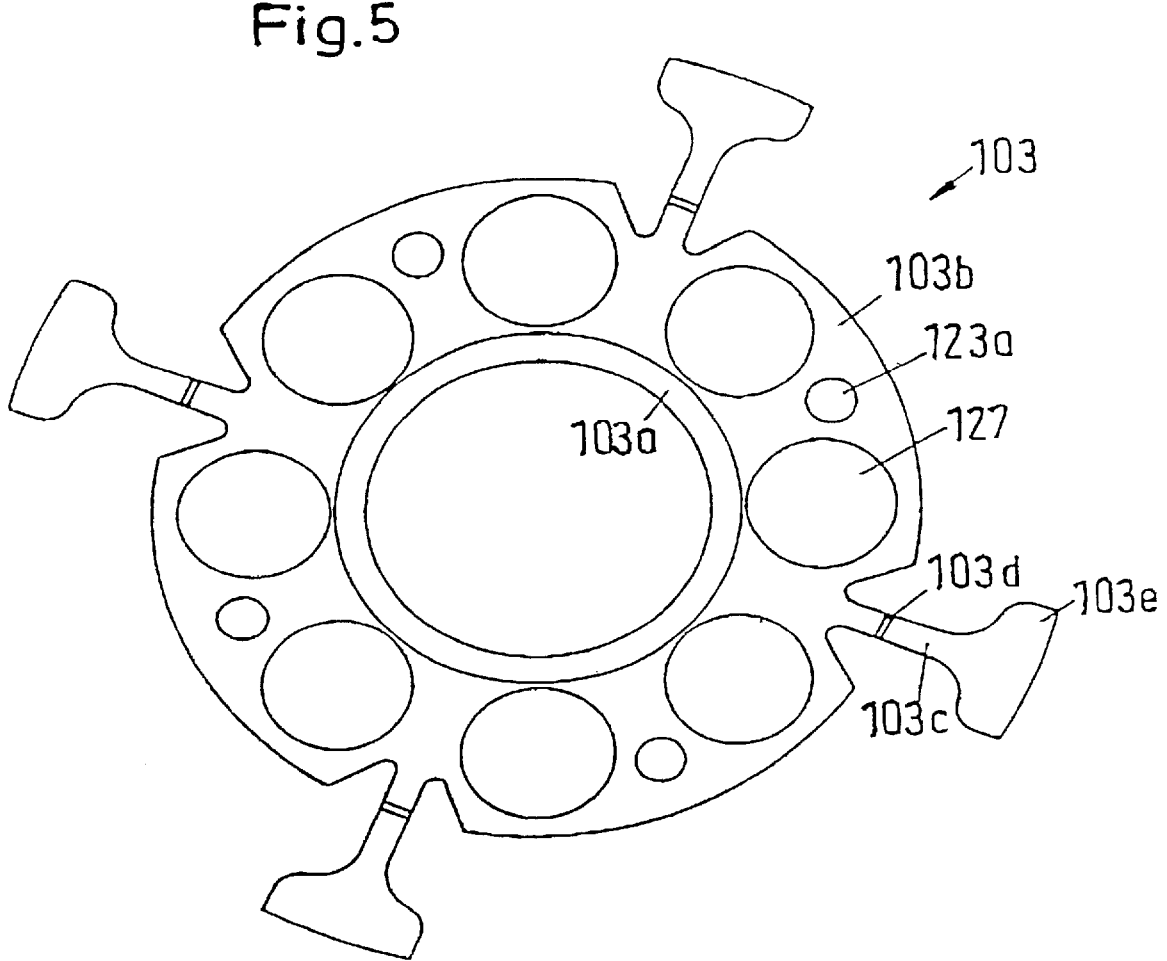

The secondary flywheel disc 103 is formed as a bearing pin 103—as apparent from FIG. 5—which has on its inner circumference an axially formed sleeve 103a which is mounted for sliding action an the sleeve 102b of the primary flywheel disc 102 wherein a slide bearing bush 112 is provided between the two sleeves 103a, 102b. The axial stop for the sleeve 103a on the sleeve 102b is formed by a stop ring 102c of right-angled profile which is drawn by its sleeve-like ring part onto a shoulder of the flywheel disc 102 wherein the flange-like ring part of the stop ring 102c forms the stop and the flange-like projection of the slide bearing bush 112 extends between the sleeve 103a and the stop ring 102c.

The sleeve 103a of the bearing pin 103 is adjoined by a radially outwardly aligned disc 103b to which the side part 123 of the damping device 122 is riveted by means of circumferentially distributed rivet spots 123 or staked in that nipples are pressed out from the disc 103b and riveted or staked to the side part 123 so that rivets can be spared.

Recesses 127 are provided in the disc 103b of the bearing pin 103 and circumferentially in the side part 123 for the purpose of passing through the assembly tools for fixing the flywheel 101.

The disc 103b of the bearing pin 103 is adjoined by extension arms 103c bent in the axial direction on the side remote from the primary flywheel disc 102 and forming an axially aligned circumference 103d on which the damping device 122 is mounted radially on the outside to save axial structural space.

In a further path the extension arms 103c are angled again in the radial direction and have on their outer circumference areas 103e widened out on the circumferential side by which the ring-shaped contact pressure plate 114 of the clutch is centred on the secondary flywheel disc 103.

The ring-shaped contact pressure plate 114 is provided on its side facing the damping device 122 and the rotor 104 with circumferential indentations 114a, 114b adapted to the rotor 105 and to the damping device to optimise the axial structural space, and also with circumferentially spread out cams 114c for fixing the two side parts 123, 124 of the damping device 122 with rivets 139.

Recesses 152 spread out round the circumference in the primary flywheel disc 102 are provided for passing through the assembly tools to fix the rivets 139.

The damping device 122 of the flywheel 101 for damping torsional vibrations consists of the flange 138 acting as the input part, the energy accumulators formed as coil compression springs 135, and the side parts 123, 124 acting as the-output part.

The flange 138 is provided on its external circumference with an external profile in the form of external teeth 138a which engage with keyed engagement into the internal teeth 102d of the primary flywheel disc 102. To secure the axial strength the flange 138 is welded, riveted or staked to the primary flywheel disc 102.

The flange 138 has on its external circumference radially pointing extension arms 140 which form the biasing devices on the input side for the coil springs 135.

Oblong holes 138b are recessed in the flange 138 extending over an angular region of the maximum relative rotation of the two flywheel discs 102, 103, and the rivets 139 are guided through the oblong holes. A distance ring 155 is provided between the two flywheel discs 102, 103 to allow relative rotation of the flange 138 opposite the side parts 123, 124 whereby the flange is supported on a spring ring 156 for fixing the play.

The side parts 123, 124 form a housing which defines circumferentially ring-shaped chambers 137 in which the coil springs 135 are housed, In the illustrated embodiment the two side parts are shaped so that they form radially inside the circumference defined by the rivets 139 a ring-channel like holder from which the chambers 137 are formed through axial indentations or imprinted areas 142 extending axially over the entire circumference, whereby the imprinted areas 142 act as stops on the circumferential side and thus as biasing devices for the coil springs 135.

The coil springs 135 which are spread over the entire circumference are in this embodiment short compared with the circumference on which they are arranged so that for example six coil springs 136 can be used. As a result of the reduced centrifugal forces through an arrangement with smaller circumferences than the external circumference of the flywheel disc 102 and through the use of short energy accumulators it is possible to dispense with a wear-protective shell and lubrication as a result of reduced wear.

The patent claims filed with the application are proposed wordings without prejudice for obtaining wider patent protection. The applicant retains the right to claim further features disclosed up until now only in the description and/or drawings.

References used in the sub-claims refer to further designs of the subject of the main claim through the features of each relevant sub-claim; they are not to be regarded as dispensing with obtaining an independent subject protection for the features of the sub-claims referred to.

The subjects of these sub-claims however also form independent inventions which have a design independent of the subjects of the preceding claims.

The invention is also not restricted to the embodiments of the description. Rather numerous amendments and modifications are possible within the scope of the invention, particularly those variations, elements and combinations and/or materials which are inventive for example through combination or modification of individual features or elements or process steps contained in the drawings and described in connection with the general description and embodiments and claims and which through combinable features lead to a new subject or to new process steps or sequence of process steps insofar as these refer to manufacturing, test and work processes.

What is claimed is:

1. Divided flywheel comprising:
    a primary flywheel mass connected to, and secured against rotation relative to, the drive shaft of an internal combustion engine; and
    a secondary flywheel mass, wherein:
        a) the flywheel masses are mounted one on the other and rotatable relative to each other against the action of a damping device,
        b) the primary flywheel mass consists at least of one flywheel disc which is connected to the drive shaft and which has on its radially outer circumference an axially aligned ring-shaped platform on which a rotor of an electric machine is mounted,
        c) the secondary flywheel mass consists of a flywheel disc which supports a clutch for coupling and uncoupling a unit following in the force flow, and
        d) the damping device is mounted at approximately the same axial height as, and radially inside of, the rotor.

2. Flywheel according to claim 1, wherein the damping device is arranged to have minimal thermal communication with the rotor.

3. Flywheel according to claim 1, wherein the primary flywheel disc supporting the rotor is made from a shaped metal part.

4. Flywheel according to claim 3, wherein the shaped metal part is made by the cold re-shaping technology.

5. Flywheel according to claim 1, wherein the ring-shaped platform supporting the rotor is angled down axially in the direction remote from the drive shaft of the internal combustion engine.

6. Flywheel according to claim 1, wherein the rotor is connected with keyed engagement by means of an internal profile to the platform having an external profile.

7. Flywheel according to claim 6, wherein the internal profile comprises at least one tooth and the external profile comprises at least one tooth gap.

8. Flywheel according to claim 6, wherein the external and internal profiles of the rotor and platform form a positive locking connection by means of at least one groove and one spring complementary therewith.

9. Flywheel according to claim 1, wherein the platform and rotor are welded together.

10. Flywheel according to claim 1, wherein the rotor is at least one of pressed and staked onto the platform.

11. Flywheel according to claim 1, wherein a radially aligned flange is formed on the primary flywheel disc adjoining the axially aligned platform.

12. Flywheel according to claim 11, wherein the radially aligned flange forms an axial stop for the rotor.

13. Flywheel according to claim 1, wherein the rotor is riveted to the radial flange.

14. Flywheel according to claim 1, wherein the primary flywheel disc is divided into a support part supporting the rotor and arranged radially outside of the circumference for fixing the flywheel disc on the drive shaft, and into a bearing pin mounted radially inside the circumference for fixing the flywheel disc on the drive shaft.

15. Flywheel according to claim 14, wherein the support part and the bearing pin are fixed by the same fastening means on the drive shaft of the internal combustion engine.

16. Flywheel according to claim 1, wherein the primary flywheel disc is mounted on the secondary flywheel disc by bearings.

17. Flywheel according to claim 16, wherein the secondary flywheel disc is mounted on the primary flywheel disc by bearings.

18. Flywheel according to claim 17, wherein the bearings are produced by means of at least one of rolling bearings and slide bearings.

19. Flywheel according to claim 17, wherein the bearings of the flywheel discs on each other are produced on a circumference radially inside the fastening of the flywheel on the drive shaft of the internal combustion engine.

20. Flywheel according to claim 17, wherein the bearing of the flywheel discs on each other is produced on a circumference radially outside of the fastening of the flywheel on the drive shaft of the internal combustion engine.

21. Flywheel according to claim 18, wherein for the slide bearing an axially acting ring-shaped stop with right-angled profile is drawn in the axial direction onto the flywheel disc forming the bearing holder.

22. Flywheel according to claim 1, wherein a pilot bearing is provided for bearing a gear input shaft on a circumference provided radially inside the bearing of the flywheel discs on each other.

23. Flywheel according to claim 1, wherein a bearing bush is provided between the flywheel disc holding a pilot bearing, and the pilot bearing itself.

24. Flywheel according to claim 1, wherein the primary flywheel is balanced by means of compensating weights.

25. Flywheel according to claim 24, wherein the compensating weights are attached on the primary flywheel disc preferably on at least one of the support disc and a side part forming the chamber for the damping device.

26. Flywheel according to claim 1, wherein the primary flywheel disc has on the inner circumference of the axially aligned ring-shaped platform a radially inwardly directed flange which forms the input part for the damping device.

27. Flywheel according to claim 26, wherein the radially inwardly directed flange is welded and/or staked to the internal circumference of the platform.

28. Flywheel according to claim 26, wherein the radially inwardly directed flange by means of an external profile forms a positive locking connection with the ring face which has an internal profile.

29. Flywheel according to claim 1, wherein the damping device is housed in chambers formed by constituent parts of the two fly-wheel discs.

30. Flywheel according to claim 1, wherein the damping device contains at least two coil compression springs spread approximately evenly over a circumference of the flywheel.

31. Flywheel according to claim 30, wherein the coil compression springs are pre-curved to approximately their insert diameter.

32. Flywheel according to claim 30, wherein the damping device contains coil compression springs boxed in each other.

33. Flywheel according to claim 30, wherein at least one wear-protective shell is installed between an inside of an external circumference of chambers holding the coil compression springs, and the coil compression springs themselves.

34. Flywheel according to claim 33, wherein the chamber for the damping device is filled at least in part with at least one of oil and grease.

35. Flywheel according to claim 30, wherein the primary flywheel has a radially inwardly directed flange which contacts as input part of the damping device biasing devices for the coil compression springs.

36. Flywheel according to claim 35, wherein the biasing devices are formed in the flange by radially aligned extension arms.

37. Flywheel according to claim 1, wherein two side parts forming chambers, which are open on one side and agree in number with the number of coil compression springs, form an output part of the damping device and are connected to the secondary flywheel disc and that the radially inwardly directed flange engages into the open side.

38. Flywheel according to claim 37, wherein the disc parts form chambers arranged ring-shaped over the circumference and having in the circumferential direction axial indentations which separate the chambers from each other and thus act as biasing devices for the output part.

39. Flywheel according to claim 38, wherein at least one of the disc parts forming the chambers is fixed on the secondary flywheel disc and that at least one of the disc parts forming the chambers is connected to a contact pressure plate belonging to the clutch.

40. Flywheel according to claim 30, wherein the radially inwardly directed flange has a number of oblong holes corresponding to a number of fastening means connecting the side parts and contact pressure plate, wherein oblong holes extend more or less uniformly over a circumference over an angle of the maximum relative rotation between the primary and secondary flywheel discs and the fastening means are guided through the oblong holes.

41. Flywheel according to claim 40, wherein the distance rings which surround the fastening means are provided between the two side discs forming the chambers so that the ability of the radially inwardly directed flange to rotate opposite the side discs remains.

42. Flywheel according to claim 26, wherein the axial play of the radially inwardly directed flange is fixed by means of a spring element installed between the flange and side part.

43. Flywheel according to claim 40, wherein the fastening means for connecting the contact pressure plate to the side parts forming the chambers are at least one of rivets and screws.

44. Flywheel according to claim 1, wherein the primary flywheel disc has at least one side part forming a number of chambers open on one side and holding the coil compression springs and corresponding in number to the number of coil springs, the side part forming the input part of the damping device.

45. Flywheel according to claim 44, wherein the side part is fixed on the drive shaft of the internal combustion engine by the same fastening means as the support disc.

46. Flywheel according to claim 44, wherein the side part is fixed on the drive shaft axially between the constituent parts of the primary flywheel disc used as the bearing pin and support part.

47. Flywheel according to claim 44, wherein a second side part is connected to the first side part and forms with this a radially inwardly open chamber.

48. Flywheel according to claim 47, wherein the two side parts are at least one of sealingly welded, riveted and staked together.

49. Flywheel according to claim 1, wherein a radially outwardly extending flange provided as an output part and connected to the secondary flywheel disc extends into the radially inwardly arranged opening of the chamber which is formed by at least one side part.

50. Flywheel according to claim 49, wherein the radially outwardly aligned flange is at least one of screwed, staked and riveted axially to the secondary flywheel disc in the region of the internal circumference.

51. Flywheel according to claim 50, wherein the flange and side part(s) have biasing devices for the coil compression springs.

52. Flywheel according to claim 50, wherein the biasing devices of the outwardly directed flange are formed by means of radial extension arms approximately the size of the diameter of the coil compression springs.

53. Flywheel according to claim 50, wherein the biasing devices of the at least one side part are formed by axial indentations of the at least one side part.

54. Flywheel according to claim 50, wherein the flange and side parts are sealed from each other by sealing means.

55. Flywheel according to claim 54, wherein the seal of the chambers is provided by sealing means between a side part and the flange on one side and between the flange and the radially inwardly extending bearing pin on the other.

56. Flywheel according to claim 54, wherein the sealing means consist of moulded parts produced by injection moulding.

57. Flywheel according to claim 56, wherein the moulded parts produced by injection moulding are made from plastics.

58. Flywheel according to claim 54, wherein the sealing means are snap-fitted in recesses provided in at least one of the flange, bearing pin and the at least one side part.

59. Flywheel according to claim 54, wherein the fixing of the sealing means is undertaken by at least one spring element.

60. Flywheel according to claim 55, wherein the side part is centered on a protruding shoulder of the support part.

61. Flywheel according to claim 55, wherein the bearing pin is centered on a protruding shoulder of the side part.

62. Flywheel according to claim 1, wherein the primary disc is centered by means of a protruding shoulder on the drive shaft of the internal combustion engine.

63. Flywheel according to claim 2, wherein thermal communication is minimized by an air gap established on the outer circumference of the primary flywheel disc between the radially outer circumference of the damping device and the axially extending platform holding the rotor.

64. Flywheel according to claim 63, wherein air gaps are formed between at least one of the primary and secondary flywheel disc on one side and the damping device on the other.

65. Flywheel according to claim 64, wherein at least one air gap is automatically ventilated.

66. Flywheel according to claim 1, wherein ventilation of the damping device is produced through the rotation of the flywheel.

67. Flywheel according to claim 66, wherein at least one ventilation slit is provided at least in one flywheel disc for ventilating the damping device.

68. Flywheel according to claim 67, wherein a number of air slits spread out over a circumference with the diameter of the circumference on which the chambers for the damping device are set is provided for ventilating the damping device.

69. Flywheel according to claim 1, wherein the secondary flywheel disc is extended frusto-conically in the axial direction, with the tip of the truncated cone facing the primary flywheel disc.

70. Flywheel according to claim 1, wherein a bearing of the flywheel discs on each other is set at approximately the same axial height as the central axial extension of the rotor.

71. Flywheel according to claim 1, wherein a bearing of the flywheel discs on each other is set at approximately the same axial height as the central axial extension of the damping device.

72. Flywheel according to claim 1, wherein for mounting the flywheel on the drive shaft recesses are provided in the secondary flywheel disc for assembly tools.

73. Flywheel according to claim 1, wherein the clutch is mounted radially inside the largest axial extension of a stator belonging to the electric machine.

74. Flywheel according to claim 1, wherein the damping device is mounted radially inside a clutch formed from at least one contact pressure plate, a pressure plate and a clutch disc set in between same.

75. Flywheel according to claim 1, wherein the unit following in the force flow is a gear input shaft of a gearbox.

76. Flywheel according to claim 1, wherein a stator cooperating with the rotor of the electric machine is connected to the motor housing.

77. Flywheel according to claim 1, wherein a stator of the electric machine in electric connection with the rotor is connected directly to the gearbox housing.

* * * * *

UNITED STATES PATENT AND TRADEMARK OFFICE
CERTIFICATE OF CORRECTION

PATENT NO.   : 6,726,569 B1
DATED        : April 27, 2004
INVENTOR(S)  : Holger Seidl et al.

It is certified that error appears in the above-identified patent and that said Letters Patent is hereby corrected as shown below:

<u>Title page,</u>
Item [75], Inventor, please add -- Winfried Keller, Grafing, Germany --
Item [73], Assignee, please add -- BMW AG, Munchen, Germany --

Signed and Sealed this

Ninth Day of November, 2004

JON W. DUDAS
*Director of the United States Patent and Trademark Office*